Sept. 18, 1934.    R. G. ZELEDON    1,974,386

PISTON RING

Filed April 22, 1931

Inventor
Ralph G. Zeledon
by Hazard and
Miller
Attorneys

Patented Sept. 18, 1934

1,974,386

UNITED STATES PATENT OFFICE 1,974,386

PISTON RING

Ralph G. Zeledon, South Pasadena, Calif.

Application April 22, 1931, Serial No. 531,974

7 Claims. (Cl. 309—45)

This invention relates to improvements in piston rings and piston ring assemblies.

An object of the present invention is to provide an improved piston ring the interior of which is vertically notched with a plurality of notches which render the ring quite resilient or flexible so that the ring is capable of conforming to cylinder walls which may not be perfectly cylindrical. In internal combustion engines and the like it frequently occurs that the cylinders wear "out of round" and while the improved piston ring may be employed on pistons in new cylinders which are perfectly cylindrical, the vertical notching on the interior of the ring renders it sufficiently flexible so that it will conform to cylinder walls which have become worn and which are not perfectly cylindrical. This increased flexibility is highly advantageous when an expander is mounted on the piston on the interior of the ring.

More specifically another object of the invention is to provide a piston ring which is vertically notched to render the ring more flexible and to bevel off the top of the ring, the bevel extending from the ends of the notches, or thereabouts, to the interior of the ring. The purpose of this bevel will be hereinafter more fully explained.

With the foregoing and other objects in view, which will be made manifest in the following detailed description, and specifically pointed out in the appended claims, reference is had to the accompanying drawing for an illustrative embodiment of the invention, wherein:

Figure 1:
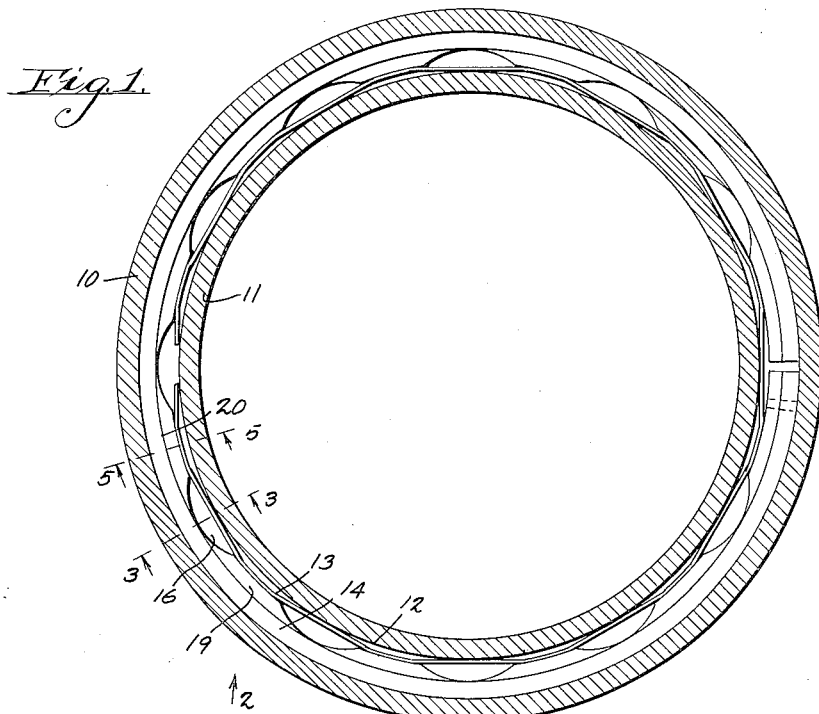
Fig. 1 is a sectional view through a cylinder and a piston therein illustrating the piston as having been provided with an expander and a piston ring embodying one form of the invention.
Figure 2:
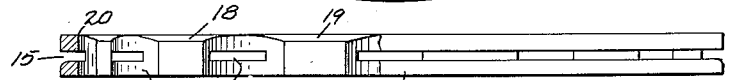
Fig. 2 is a view in elevation of the improved ring, parts being broken away and shown in section.

Referring to the accompanying drawing, wherein similar reference characters designate similar parts throughout, the reference character 10 designates a cylinder within which there is a piston 11 having a ring groove 12. Within the ring groove 12 there is an expander 13 which is disposed inside of a piston ring 14. The piston ring 14 is preferably provided with an exterior annular groove 15 and on the interior of the ring there are formed vertical notches 16. These vertical notches 16, in the modification shown in Figs. 1 to 5, are vertically arranged and are rounded as clearly shown in Figure 1. The bottoms of the notches communicate with the exterior groove 15 as indicated at 17 on Figure 2. At the bottoms of the notches the ring is of reduced thickness and consequently is of greater flexibility than at points between the notches so that the ring may be regarded as being of a plurality of small sections flexibly joined together at the bottoms of the notches. If the cylinder 10 has become worn so that it is no longer perfectly cylindrical, these flexibly connected sections of the ring may bend relatively to each other so as to accommodate themselves to the cylinder. The expander 13 on the interior of the ring assists in causing the ring to deform itself if necessary in order to accommodate itself to the "out of round" cylinder walls. This expander is illustrated as having been made up of a single strip of metal which has been crimped or corrugated to form outermost portions which are spaced apart a distance equal to the distance across the inner end of a notch. These outermost portions bear against the interior of the ring and are connected by intervening portions which may be considered innermost portions which bridge the notches. These innermost portions may bear against the back of the piston ring groove although in many instances as the ring expands and the expander expands with it, the expander will be disposed out of engagement with the piston except possibly against the ring lands. If desired a flat strip such as that disclosed in my pending application Serial No. 288,704, filed June 27, 1928, may be interposed between the expander and the interior of the piston ring.

Figure 3:
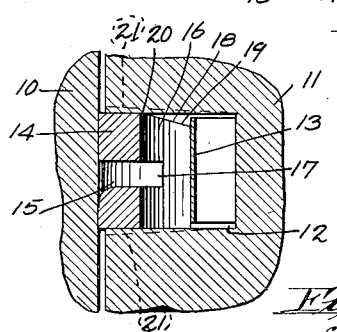
Fig. 3 is a sectional view taken substantially upon the line 3—3, illustrating the ring in a ring groove on the piston prior to the ring groove having become worn.
Figure 4:
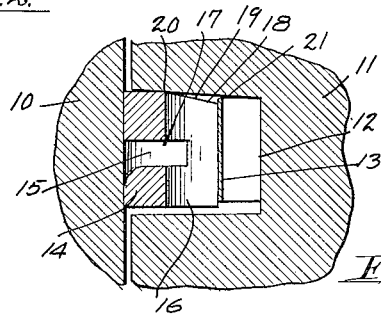
Fig. 4 is a view similar to Figure 3 illustrating the same ring in a worn ring groove.
Figure 5:
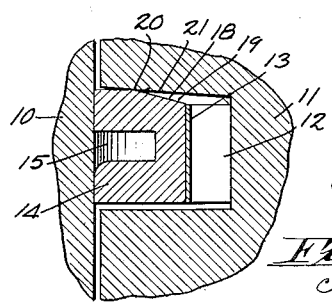
Fig. 5 is a sectional view taken upon the line 5—5 upon Figure 1.

The top of the piston ring is beveled off as indicated at 18. This bevel begins at a point near the bottoms of the notches 16 and extends inwardly to the inner surface of the piston ring. By having the bevel so arranged the portions 19 between adjacent notches will be completely beveled off and an edge or line of contact will be presented at the outer end of the bevel, such edge being indicated by the reference character 20. The purpose of this construction is briefly as follows. When the piston is originally constructed, the top and bottom walls of the ring groove or the ring lands are straight and parallel as shown in Figure 3. During the down stroke of the piston when the ring is at the top of the groove, the flat top surface of the ring being in contact with the flat top surface of the upper ring land effectively prevents the escape of oil through the interior of the ring and between the top of the ring and the upper ring land to the combustion chamber. However, it so happens that the ring groove becomes worn in the course of time and the ring lands instead of remaining parallel are so worn as to converge inwardly. This is indicated by dotted lines 21 on Figure 3. Figure 4 illustrates in full lines the worn condition of the ring groove. When the ring groove has become so worn, the bevel 18 presenting the line of contact 20 is such that this line of contact will seat on the upper ring land as shown in Figure 4 and preserve the tight seal so that oil cannot escape from the interior of the piston ring past the line of contact between the top of the piston ring and the upper ring land. It will be readily appreciated that if the portions 19 were not beveled off that the inner edges of these portions would engage the upper ring land and would hold the body of the piston ring out of engagement with the upper ring land. If the body of the ring were held out of engagement with the upper ring land by the inner ends of portions 19, oil could readily escape past the piston ring by flowing up through the notches and escaping through the upper ends of the notches and then between the top of the piston ring and the upper ring land. By thus beveling off portions 19, these portions cannot hold the piston ring out of contact with the upper ring land and the ring will maintain a continuous line of contact with the upper ring land even though the ring land may have become as badly worn as is illustrated by the exaggerated showing.

Figure 6:
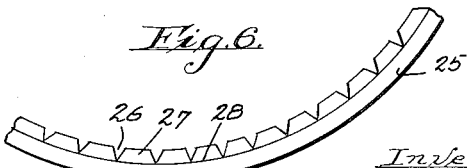
Fig. 6 is a partial plan view illustrating a slightly modified form of construction.

Figure 6 illustrates a similar construction to that previously described wherein the ring 25 has a plurality of V-shaped vertical notches 26 formed on its interior. These V shaped notches are preferably arranged somewhat closer together than the round notches illustrated in Figure 1 and render the ring somewhat more flexible. In this modification also the top of the ring is beveled off so that the portions 27 between the notches present beveled top surfaces and there will be maintained a line of contact 28 outwardly of the notches which will seat on the upper ring land even though the upper ring land may have become worn.

From the above described construction it will be appreciated that an improved piston ring and piston ring assembly is provided wherein the piston ring is vertically notched to render the ring in the nature of a plurality of flexibly connected segments capable of conforming to non-circular cylinder walls. The portions of the ring between the notches have their upper ends beveled off so as to preserve a continuous line of contact on the upper surface of the ring which will seat upon the upper ring land and prevent the escape of oil even though the ring groove may have become worn.

Various changes may be made in the details of construction without departing from the spirit or scope of the invention as defined by the appended claims.

I claim:

1. A piston ring having notches formed on the interior of the ring extending from top to bottom thereof and rendering it flexible so as to be capable of conforming to cylinder walls which may not be perfectly cylindrical, the top of the ring being beveled off from the bottoms of the notches inwardly.

2. A piston ring having vertical notches formed on its interior rendering it of sufficient flexibility so as to be capable of conforming to cylinder walls which may not be perfectly cylindrical, the top of the ring being beveled off from the bottoms of the notches inwardly.

3. A piston ring assembly comprising a ring having notches formed on its interior extending from top to bottom of the ring rendering the ring flexible, and an expander within the ring, the top of the ring being beveled off from the bottoms of the notches inwardly.

4. A piston ring assembly comprising a piston ring which is vertically notched on its interior, and an expander within the ring bent from top to bottom providing alternate outermost portions which bear on the interior of the ring without entering the notches and intermediate innermost portions which are disposed inwardly of the outermost portions, said piston ring having an exterior circumferential groove communicating with the notches.

5. A piston ring assembly comprising a piston ring which is vertically notched on its interior, and an expander within the ring bent from top to bottom providing alternate outermost portions which are engageable with the inside of the ring between the notches and intermediate portions disposed inwardly of the outermost portions, said piston ring having an exterior circumferential groove communicating with the notches.

6. A piston ring having notches formed on the interior of the ring extending from top to bottom thereof and rendering it flexible so as to be capable of conforming to cylinder walls which cannot be perfectly cylindrical, one side of the ring being beveled off from the bottoms of the notches inwardly.

7. A piston ring assembly comprising a piston ring having a multiplicity of closely adjacent vertical notches formed on its interior reducing the thickness of the ring at the notches so as to render the ring highly flexible and leaving inwardly projecting portions between the notches, and an expander within the ring having outermost portions engaging the inwardly projecting portions of the ring only and intervening portions spaced inwardly from the ring and bridging the notches whereby when said assembly is inserted in a ring groove said intervening portions will engage the back of the ring groove.

RALPH G. ZELEDON.